March 10, 1953
L. S. DEPWEG
2,630,716
TUNING MECHANISM
Filed Jan. 23, 1951
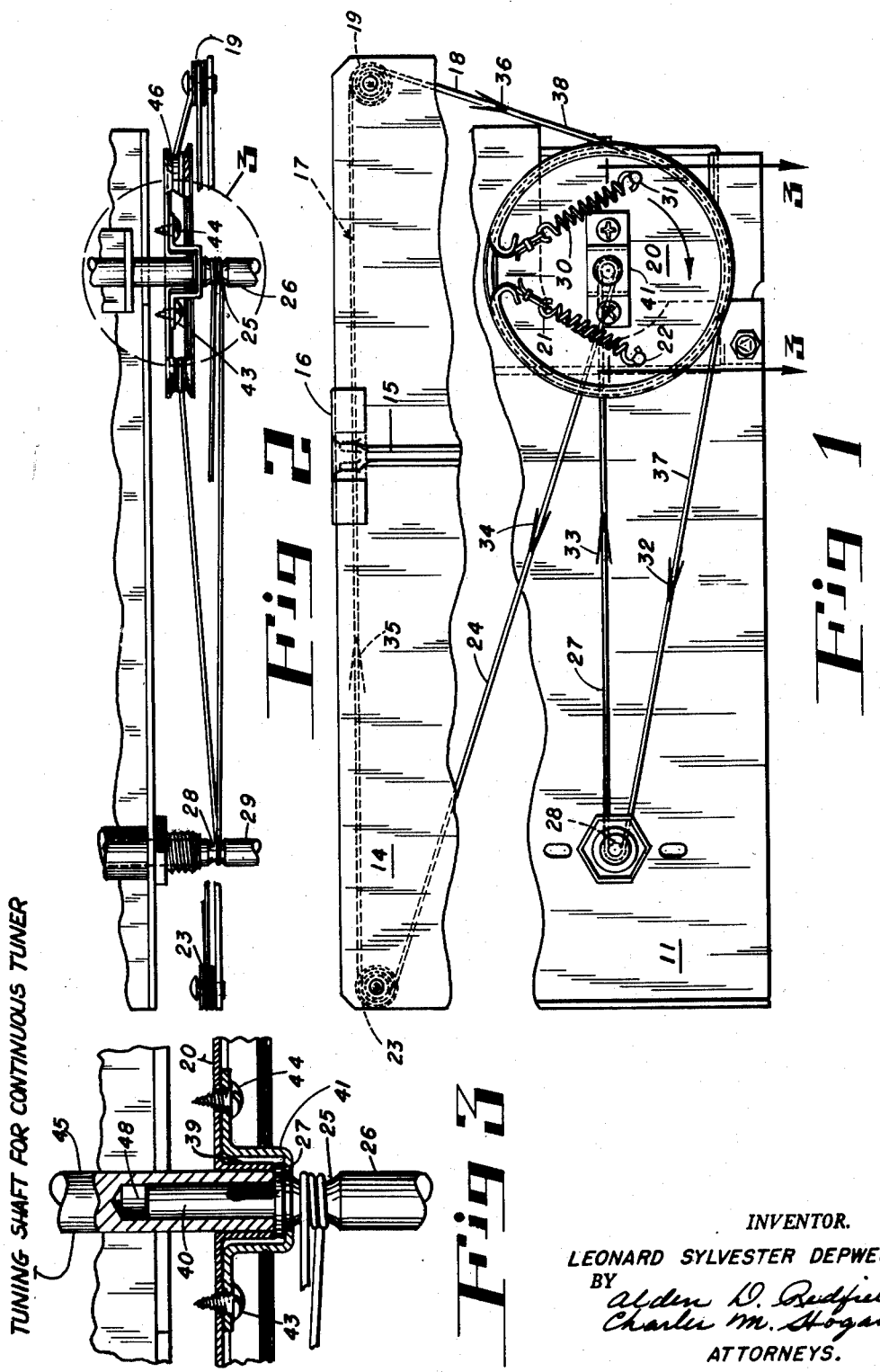
INVENTOR.
LEONARD SYLVESTER DEPWEG.
BY
Alden D. Redfield
Charles M. Hogan
ATTORNEYS.

Patented Mar. 10, 1953

2,630,716

UNITED STATES PATENT OFFICE 2,630,716

TUNING MECHANISM

Leonard S. Depweg, Hamilton, Ohio, assignor to Avco Manufacturing Corporation, Cincinnati, Ohio, a corporation of Delaware Application January 23, 1951, Serial No. 207,303

5 Claims. (Cl. 74—10.7)

The present invention relates to a driving mechanism for use in the manual control of continuous type tuners for radio and television receivers, converters and the like. A continuous type tuner is one which includes a rotor which is continuously turnable between desired limits to select any one of a number of wave signal channels within the appropriate broadcast range. Although the invention is not confined to utility with a television receiver tuner, it is particularly advantageous for conjoint use therewith. The invention is a further utility in actuating the pointer of an indicator device of the type including a slide rule index, such indicator devices being known to the trade as "slide rule dials."

The primary object of the present invention is to provide a drive mechanism which has a particularly desirable vernier effect, in the sense that it very economically and simply accomplishes a great reduction between the angular displacement of the manual control shaft which is actuated by the operator and the driven shaft, the angular displacement of which controls the angular displacement of the tuner rotor.

Another object of the invention is to provide a drive mechanism which utilizes existing components to the fullest extent.

For a better understanding of the present invention, together with other and further objects, advantages, and capabilities thereof, reference is made to the following description of the accompanying drawings, in which there is illustrated a preferred form of tuner and tuning indicator drive mechanism in accordance with the invention.

In the drawings:

Fig. 1 is a fragmentary front view of a television receiver converter unit including a preferred form of driving mechanism in accordance with the invention;

Fig. 2 is a top view of the device shown in Fig. 1, the indicator dial being omitted and a portion of the main pulley wheel being cut away for purposes of clarity and description; and Fig. 3 is a fragmentary sectional view taken along the line 3—3 of Fig. 1 and looking in the direction of the arrows.

Referring now particularly to Fig. 1 of the drawings, the drive mechanism is shown as incorporated in an ultra high frequency converter unit for a television receiver. Such a unit performs the function of converting ultra-high carrier frequencies to a fixed frequency to which the main television receiver is fixed-tuned. It will be understood, however, that the driving mechanism in accordance with the invention is not confined to the particular environment shown. The converter unit has the usual metallic housing (not shown) including a metallic front panel 11. Suitably mounted above and slightly in front of the front panel 11 as by angle brackets (not shown) is a support for a slide rule indicator dial (not shown), which support consists of a metallic strip 14. An indicator pointer 15 and a suitable mounting 16 for the pointer are slidably mounted on strip 14. The pointer and its mounting are slidably disposed on the upper edge of strip 14, the latter serving as a guide. It will be understood that suitable indicia (not shown) indicative of the various channels in the U. H. F. range to be received are placed in front of the metallic strip 14. It is not essential in describing the present invention to describe the slide rule dial and indicator pointer, because such devices are very well known in the art, an illustrative one being shown in Fig. 5 of my United States Patent No. 2,604,869.

Secured to the pointer mechanism for linearly displacing the same is a cord 17, one end 18 of which progresses laterally outwardly to the right from the pointer mounting 16 to an idler pulley 19, mounted on the back of strip 14, and then downwardly to the periphery of the main pulley 20, which periphery the cord follows, and finally terminates at a point of fixed security to a coiled tension spring 21 anchored by an integral tang 22 on the front face of pulley 20. The other side 24 of the cord 17 extends laterally outwardly to the left away from the pointer mounter 16 and passes around another idler pulley 23 also mounted on the back of strip 14, then progresses downwardly and in the opposite direction to a groove 25 in the main drive shaft 26, making a plurality of counter-clockwise turns about the drive shaft, next progressing laterally to the left again as shown at 27 and making a partial counter-clockwise turn about groove 28 in switch shaft 29, next again progressing diagonally downwardly and to the right, contacting the lower periphery of the main pulley member 20 and following that periphery until it reaches a point of security to a tension spring 30 anchored by an integral tang 31 on the front face of pulley 20. The arrows 32, 33, 34, 35, and 36 show the direction in which the cord moves when the control shaft 26 for the tuner (not shown) is turned clockwise, conventionally in a direction to select the upper frequency channels. It will be understood, of course, that the linear displacement of the various portions of the cord is in the opposite direction when the converter is attuned to a lower channel by counter-clockwise manual rotation of control shaft 26.

The pulley 20 is not at all rotated directly by the motion of shaft 26, the latter being freely rotatable with respect to pulley 20. The pulley 20 is actuated by portion 37 of the cord when control shaft 26 is turned clockwise. On the other hand, when control shaft 26 is turned counter-clockwise, the pulley 20 is actuated by the portion 38 of the cord 17. Because of the free rotatable mounting of control shaft 26 relative to pulley 20, a reduction of angular displacement is effected in accordance with the ratio of the diameters between members 26 and 20. For example, let the groove diameter of main pulley 20 be equal to $D_1$ and let the diameter of the groove of shaft 26 be equal to $D_2$. Then the number of turns of control shaft 26 required for one-half revolution of pulley 20 is equal to $$\frac{D_1}{2 \cdot D_2}$$

Formed on the front face of pulley 20 is an integral forwardly extending annular flange 39 to which driven shaft 45, secured to the tuner rotor at its rear end, is rigidly secured. An integral extension of drive shaft 26 projects into a journal provided in shaft 45. Secured to the face of main pulley 20 is a U-shaped bracket 41. The legs of the U are secured to pulley 20 by screws 43 and 44, and the bight of the U is suitably apertured to receive the rear of grooved portion 25 of the manually actuated shaft 26. Shaft 26 has an expanded portion 27, rearwardly of groove 25, which bears against the rear surface of the bight of the bracket 41 and the front surface of flange 39 and shaft 45 to maintain the shaft 26 in place. The tuner proper (not shown) is actuated by the driven shaft 45, which is rigidly secured to the annular flange 39 on pulley 20. As indicated above, the driven shaft 45 is apertured at 48 to provide a suitable journal for the integral bearing 40 of drive shaft 26.

In accordance with another feature of the present invention, a conventional on-off switch (not shown) shaft 29 is utilized as a post for the positioning and reversal of cord 17, the post being grooved as shown at 28 and being of metallic construction, whereby the cord slips thereon. The pulley member 20 is grooved in conventional fashion as shown at 46.

It will be seen that the invention provides a tuner drive shaft 45 which is concentric with the control shaft 26. The invention provides a particularly simple and economical vernier tuner drive having a high ratio of speed reduction. The invention further provides a control shaft 26 which is made to turn in journal 48 in the center portion of the driven shaft 45. The control shaft 26 is, as has been explained, held in place by means of a bracket 41 fastened to the main pulley 20. This bracket serves an additional purpose as an outboard bearing. The control shaft 26 is machined to drive a flexible drive member such as the cord 17, which drive member is guided over pulleys 19 and 23 onto the driven pulley 20, the driven pulley being permanently fastened to the shaft 45 of the tuner.

While there has been shown and described what is at present considered to be the preferred embodiment of the present invention, it will be understood by those skilled in the art that various modifications and changes may be made therein without departing from the true scope of the invention as defined by the appended claims.

I claim:

1. In a driving mechanism for a continuous type tuner for a wave signal receiver, the combination of a main pulley, a driven tuning shaft rigidly secured to the rear side of and concentric with said pulley for directly actuating said tuner, a concentric manually-actuated control shaft of smaller diameter than said pulley freely rotatably mounted on the front of and relative to said pulley member, means including a flexible cord for mechanically coupling said control shaft to said pulley, and means for directly securing the ends of said cord to said pulley.

2. In a wave signal receiver of the type including a continuous tuning device, the combination of a pulley, means rigidly secured to the rear of said pulley for directly adjusting said tuning device, a manually-actuated control shaft having a smaller diameter than said pulley disposed on the front of said pulley and mounted for independent rotation relative thereto, means comprising a flexible cord and a post for mechanically coupling said control shaft to said pulley for driving the same, and means for directly securing the ends of said cord to said pulley.

3. A device in accordance with claim 2 including a pair of idlers, in which device said pulley has two anchors and in which said cord progresses from an anchor in a counter-clockwise direction around a part of the periphery of said pulley, thence upwardly to make a partial counter-clockwise turn around one of said idlers, next laterally in an upper run to make a partial counter-clockwise turn around the other of said idlers, thence laterally in the opposite direction and downwardly to make a plurality of counter-clockwise turns about said control shaft, thence laterally in a lower run to make a counter-clockwise turn around said post, thence diagonally downwardly and laterally in said opposite direction to follow a portion of the periphery of said pulley in a counter-clockwise direction and finally terminating in the other anchor secured to the front of said pulley, said idlers being disposed above said pulley and in spaced relationship to each other, said post being disposed to one side of said pulley.

4. In a driving mechanism for a continuous type tuner for a wave signal receiver, the combination of a main pulley, a driven shaft rigidly secured to the rear side of said pulley for actuating said tuner, a control shaft of smaller diameter than said pulley member rotatably mounted on the front of and relative to said pulley member, means including a flexible cord for mechanically coupling said control shaft to said pulley member, said control shaft having an integral extension projecting as a bearing into a concentric journal provided in said driven shaft.

5. A mechanism in accordance with claim 4 and a U-shaped bracket having legs secured to said pulley and a bight apertured to receive said control shaft, for maintaining said control shaft on said pulley.

LEONARD S. DEPWEG.

REFERENCES CITED

The following references are of record in the file of this patent:

UNITED STATES PATENTS

| Number | Name | Date |
|---|---|---|
| 2,205,103 | Mahnken | June 18, 1940 |